(No Model.) 2 Sheets—Sheet 1.
W. W. SCOTT.
TELEPHONE.
No. 540,761. Patented June 11, 1895.
*Fig: 1.*
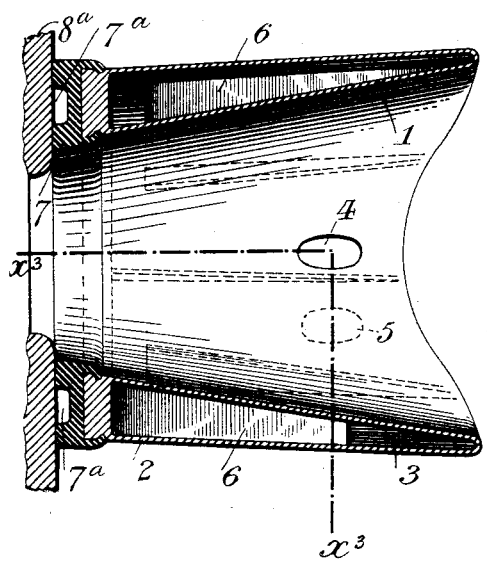
*Fig: 2.*
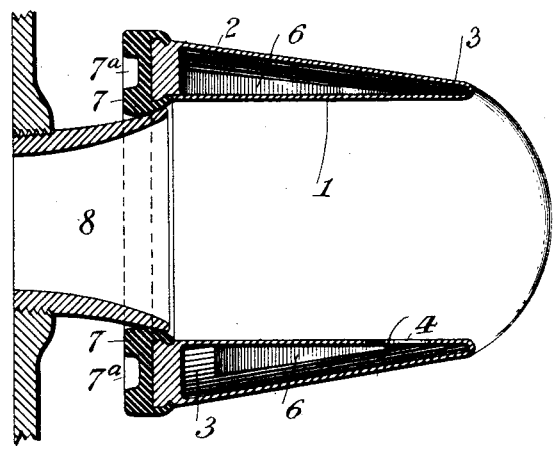
*Fig: 3.*
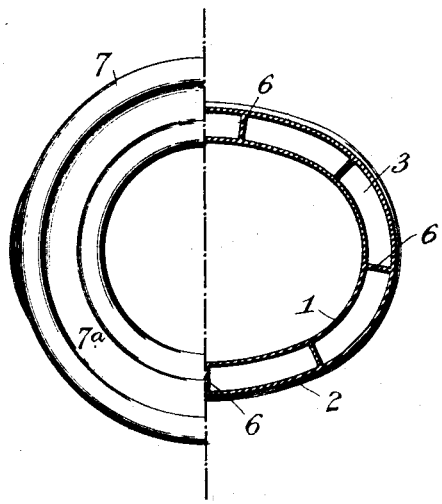
*Fig: 4.*
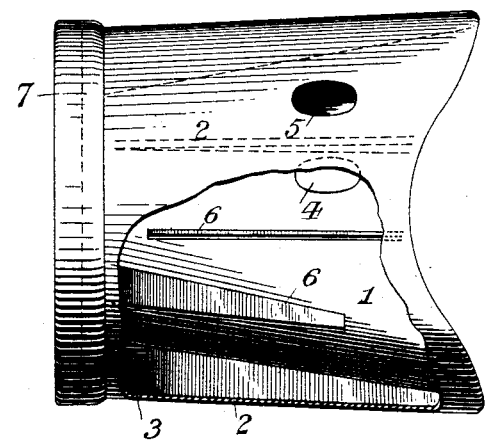
WITNESSES:
John A. Rennie
Peter A. Ross
INVENTOR:
Walter W. Scott
By Henry Connett
Attorney.

(No Model.) 2 Sheets—Sheet 2.
W. W. SCOTT.
TELEPHONE.
No. 540,761. Patented June 11, 1895.
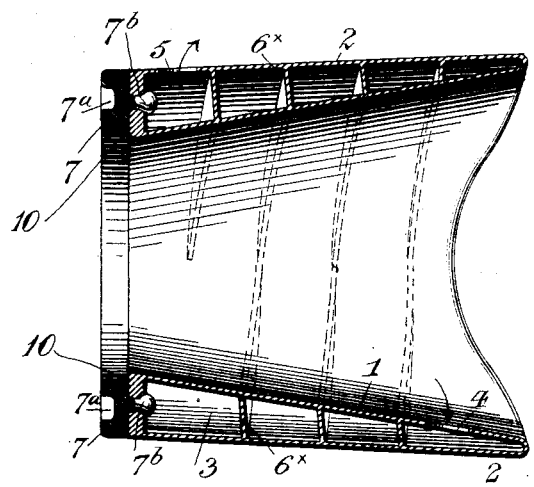
Fig: 5.
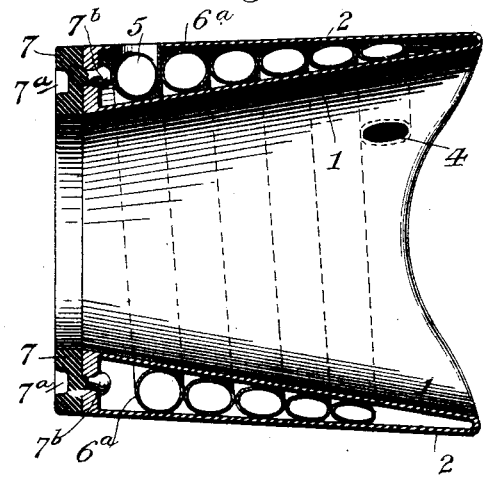
Fig: 6.
WITNESSES:
John A. Rennie.
Peter A. Rose
INVENTOR:
Walter W. Scott
By Henry Connett
Attorney.

UNITED STATES PATENT OFFICE.

WALTER W. SCOTT, OF BUFFALO, NEW YORK.

TELEPHONE.

SPECIFICATION forming part of Letters Patent No. 540,761, dated June 11, 1895.

Application filed March 4, 1895. Serial No. 540,503. (No model.)

*To all whom it may concern:*

Be it known that I, WALTER W. SCOTT, a subject of the Queen of Great Britain, residing at Buffalo, in the county of Erie and State of New York, have invented certain new and useful Improvements in Soundless Voice-Conveyers for Telephones, of which the following is a specification.

My invention relates to a device for use with a transmitting telephone, the object of the invention being to provide against the language of the person using the transmitter being understood by the bystanders.

An auxiliary object of the invention is to provide a portable, soundless voice-conveyer which may be conveniently carried by the person who uses the telephone, and which is thus an individual instrument or device, as distinguished from a public device.

Another object is to provide an instrument or device which can be readily attached to and detached from the ordinary varieties of transmitters.

My invention will be hereinafter described with reference to the accompanying drawings and its novel features carefully defined in the claims.

In the said drawings, Figure 1 is a horizontal longitudinal mid-section of an embodiment of my invention. Fig. 2 is a vertical longitudinal mid-section of the same. Fig. 3 is an end view of the same, the left side or half showing in elevation that end of the voice-conveyer which is applied to the transmitter and the right side or half being a transverse section in the plane indicated by the line $x^3 x^3$ in Fig. 1. Fig. 4 is an under side plan view partly dissected to show the zigzag or tortuous passage in the air-chamber between the shells. Fig. 5 is a sectional view similar to Fig. 1, showing another arrangement of the air-passage. Fig. 6 illustrates a modified construction wherein a rubber tube or other suitable tube forms the elongated passage for the escape of air.

Referring first to Figs. 1 to 4, which illustrate the preferred construction, my object is to provide a light and portable voice-conveying instrument which will come within as small a compass as is consistent with good results; and to this end I construct it of thin material, such as hard rubber, papier maché, celluloid, or the like, although I do not limit myself to any special material. The instrument will be somewhat tubular, as to its general form, one extremity being formed to fit snugly about the mouth of the user so as to leave his lips free and yet prevent the escape of sound waves, and the other end will be, by preference, circular and adapted to fit snugly and hermetically about the mouthpiece of the telephone. Between the outer and inner shells or tubes of which the instrument is formed is an air-space, and preferably this air space will be partitioned in some manner so as to form a zig-zag, spiral or otherwise elongated passage, one end of which opens through the inner shell into the tubular hollow of the instrument, and the other opens to the outer air through the outer shell. The object of this is to permit the breath to escape so as not to create air-tension within the instrument, and at the same time prevent the escape of sound waves which would allow the voice to be heard. 1 represents the inner shell or tube, and 2, the outer shell. Between these is an air-chamber, 3. An aperture, 4, in the inner shell permits the breath emitted in speaking to enter said air-chamber, and an aperture, 5, in the outer shell, permits it to escape freely, thus avoiding the formation of gaseous tension which would affect the diaphragm. As represented in these figures, the air-chamber 3 is divided by longitudinally arranged partitions, 6, in such a manner as to form a tortuous or zig-zag passage between the inlet 4 and outlet 5, so as to compel the air or breath to flow for a considerable distance with the view of breaking up the sound-waves and preventing the escape of articulate sounds at the outlet 5.

In Fig. 5 I have shown a spiral passage formed between the inlet 4 and outlet 5 by means of a continuous partition, $6^x$, extending spirally about the inner shell in a manner to divide up the air-chamber. It is not very material to my invention how this elongated spiral passage is formed, but I prefer the arrangement illustrated in the first four figures of the drawings.

In Fig. 6 I have shown the elongated air-passage formed by coiling or winding a tube, $6^a$, about the inner shell within the air-chamber, one end of said tube being connected with the inlet 4, and the other end with the outlet 5.

It is intended that the conveyer shall be attached removably to the mouthpiece of the telephone, while in use, in such a manner that it will remain so attached and supported without the aid of the hands; and as there are in use two common forms of mouthpieces for telephones, I provide means for securing my instrument to either of them.

On the end of the instrument which is applied to the telephone is an annular face-piece, 7, of soft rubber, and the opening in this face-piece is made of such size as to require a slight pressure to force it onto the projecting mouthpiece, 8, as seen in Fig. 2; but some telephones do not employ a projecting mouthpiece, having a smooth, vertically arranged surface about the diaphragm-aperture. To enable the instrument to be attached to this surface (8ª in Fig. 1) I form a channel, 7ª, in the face-piece 7, whereby, when the latter is pressed forcibly up to and flattened against the surface 8ª, the instrument will be held in place by "suction" or atmospheric pressure.

Preferably the instrument will be only about three inches long and about three inches wide at its widest part, so that it can be carried on the person, and it will also be light and portable. I do not, however, limit myself as to such size and proportions.

The soft rubber face-piece 7 may be attached to the end of the instrument in any way or by any suitable means. In Figs. 1 and 2 I have shown it as clasping the annular end of the instrument, and in Fig. 5 as having on it tenons, 7ᵇ, which engage holes or recesses in the end of the instrument.

As the leading purpose of the instrument is to deaden or destroy the sound of the voice, I employ the air-space or chamber 3, a closed air-space being a most effective intercepter of sound vibrations. Its use in lieu of a solid or packed space also reduces the weight of the instrument materially. The passage between the inlet 4 and outlet 5, for the breath, is elongated so as to break up, the vibrations. It is tortuous, so as to be compact, as well as to change the course of the current of air at frequent intervals; and where it is in the form of a tube—as in Fig. 6—the tube should be of some soft, non-vibrant material, like soft-rubber. In its passage through such a tube, the vibrations of the air will be absorbed or lost.

If desired, a shoulder may be formed or left at the end of the instrument for the mouthpiece 8 of the telephone to abut against. This is shown in Fig. 5 where the face-piece 7 is represented as cut away to leave a rabbet or shoulder at 10. The inner clasping flange is not absolutely essential to the retention of the face-piece 7, and it may be omitted.

I am aware that, broadly speaking it is not new to provide a telephone mouthpiece with an air-space and with a passage through this space for the breath. Such a construction does not provide a passage of sufficient length to fulfill my purpose. Therefore I provide my voice-conveyer with an elongated, confined and tortuous passage extending around the voice conveyer in a zig-zag or spiral manner.

Having thus described my invention, I claim—

1. A voice-conveyer for use with a transmitting telephone, comprising a tube with double walls having an elongated, confined, tortuous passage extending around the inner tube in a zig zag or spiral manner, one end of said passage opening outwardly and the other into the passage through the instrument, substantially as set forth.

2. A voice-conveyer for use with a transmitting telephone, comprising a tube having double walls with an air-chamber 3, between them, said space being partitioned into a tortuous passage for the breath, and said passage communicating at one end with an inlet 4, in the inner wall of the tube and the other communicating with the outer air through an outlet 5, substantially as set forth.

3. A portable voice-conveyer for use with a transmitting telephone, comprising a tubular instrument formed at one end to fit about the mouth of the user and being provided at its other end with a soft rubber face-ring to fit about the mouthpiece of the telephone, said face-ring having in it a channel 7ª, whereby the instrument is adapted for attachment to different forms of receivers, substantially as set forth.

4. A portable voice-conveyer for use with a transmitting telephone, comprising a light tube adapted at one end to fit about the mouth of the user and having secured to its other end a face-ring 7, of soft rubber provided with a channel 7ª in its face, whereby it is adapted to be secured to the face of the telephone and held there while in use by atmospheric pressure, substantially as set forth.

In witness whereof I have hereunto signed my name in the presence of two subscribing witnesses.

WALTER W. SCOTT.

Witnesses:
EZRA G. BENTLEY,
WILLIAM J. BLAKE.